US010054606B2

(12) United States Patent
Rondeau et al.

(10) Patent No.: US 10,054,606 B2
(45) Date of Patent: Aug. 21, 2018

(54) METHOD FOR DETERMINING THE SPEED OF A ROTOCRAFT RELATIVE TO THE SURROUNDING AIR

(71) Applicant: THALES, Courbevoie (FR)

(72) Inventors: Philippe Rondeau, Allex (FR); Jean-Pierre Schlotterbeck, Rochefort-Samson (FR); Xavier Lacondemine, Valence (FR)

(73) Assignee: Thales, Courbevoie (FR)

( * ) Notice: Subject to any disclaimer, the term of this patent is extended or adjusted under 35 U.S.C. 154(b) by 357 days.

(21) Appl. No.: 14/652,770

(22) PCT Filed: Dec. 20, 2013

(86) PCT No.: PCT/EP2013/077620
§ 371 (c)(1),
(2) Date: Jun. 16, 2015

(87) PCT Pub. No.: WO2014/102175
PCT Pub. Date: Jul. 3, 2014

(65) Prior Publication Data
US 2015/0323559 A1 Nov. 12, 2015

(30) Foreign Application Priority Data

Dec. 28, 2012 (FR) ..................... 12 03618

(51) Int. Cl.
*G01P 5/26* (2006.01)
*G01F 1/66* (2006.01)
(Continued)

(52) U.S. Cl.
CPC ............... *G01P 5/26* (2013.01); *B64D 43/02* (2013.01); *G01F 1/661* (2013.01); *G01S 17/58* (2013.01); *G01S 17/88* (2013.01); *G01S 17/95* (2013.01)

(58) Field of Classification Search
None
See application file for complete search history.

(56) References Cited

U.S. PATENT DOCUMENTS

| 4,735,503 A | 4/1988 | Werner et al. |
| 6,751,532 B2 * | 6/2004 | Inokuchi ................. G01S 17/58 |
| | | 701/14 |

(Continued)

FOREIGN PATENT DOCUMENTS

| FR | 2761162 A1 | 9/1998 |
| FR | 2891409 A1 | 3/2007 |

OTHER PUBLICATIONS

Laser Doppler anemometry: recent developments and future challenges C Tropea 1995 Meas. Sci. Technoi. 6 605 (Year: 1995).*
(Continued)

*Primary Examiner* — Jelani A Smith
*Assistant Examiner* — Paul A Castro
(74) *Attorney, Agent, or Firm* — Davis Wright Tremaine LLP; Michael J. Donohue

(57) ABSTRACT

A method for determining the speed vector ($\vec{Vd}$), with respect to the surrounding air, of a rotary wing aircraft (HL) equipped with a beam scanning Doppler laser anemometry device for measuring (Step1) a set of projections (Vm) of said speed vector ($\vec{Vd}$) in at least four non-coplanar directions, comprising the following steps:
  detecting (Step2) any anomaly of at least one element from the set of measured projections (Vm), from a comparison with respect to a first threshold (S1), of a deviation between the measurements (Vm) and the measurements (Vp) predicted from a predetermined model depending on values of beam scanning parameters of the anemometry device; and
(Continued)

reducing (Step3) the effect of a detected anomaly by invalidating measurements corresponding to said anomaly and computing the components of the speed vector from valid measurements.

10 Claims, 3 Drawing Sheets

(51) Int. Cl.
  *G01S 17/88* (2006.01)
  *B64D 43/02* (2006.01)
  *G01S 17/58* (2006.01)
  *G01S 17/95* (2006.01)

(56) References Cited

U.S. PATENT DOCUMENTS

| | | | |
|---|---|---|---|
| 2003/0043058 A1 | 3/2003 | Jamieson et al. | |
| 2006/0262324 A1* | 11/2006 | Hays | G01N 21/47 356/519 |
| 2010/0128252 A1 | 5/2010 | Perrie et al. | |
| 2011/0043786 A1* | 2/2011 | Lacondemine et al. | G01S 17/58 356/28.5 |
| 2012/0089362 A1 | 4/2012 | Mandle | |
| 2012/0212369 A1 | 8/2012 | Revol et al. | |

OTHER PUBLICATIONS

International Search Report issued in international application No. PCT/EP2013/077620, dated Nov. 4, 2014 (11 pages).

* cited by examiner

METHOD FOR DETERMINING THE SPEED OF A ROTOCRAFT RELATIVE TO THE SURROUNDING AIR

BACKGROUND OF THE INVENTION

Field of the Invention

The present invention relates to a method for determining the speed of a rotary wing aircraft with respect to the surrounding air, and an associated device.

Description of the Related Art

Anemometry systems for rotary wing aircraft, such as helicopters, are generally identical to those of airplanes and therefore based on measurements of total pressure, for example using Pitot tubes, and of static pressure.

Such systems are however poorly adapted to rotary wing aircraft, because they become inoperative at low speed, in particular when the aircraft is substantially in static flight, in lateral flight or in backward flight, which compels visual piloting.

Moreover, lack of knowledge of the local wind during takeoff from an area not equipped with an anemometer can result, for safety reasons, in limiting the payload carried.

Various methods have been proposed, since the 1970s, for trying to measure airspeed, i.e. the speed of the aircraft with respect to the surrounding air, when the conventional means are inoperative, whether by means of pressure measurement or of weathervanes placed in the vicinity of the rotor, or indirectly by combining different internal parameters.

These alternative methods remain complex and their use is essentially limited to flight tests or to high performance military carriers.

The document FR 2761162 discloses the measurement of the speed of a helicopter with respect to the surrounding air by a Doppler LiDAR device. This device is based on the measurement of the frequency shift, by the Doppler effect, between a laser beam transmitted into the atmosphere and the beam backscattered by the particles naturally present in the probed air volume. This Doppler frequency is directly proportional to the projection, along the sighting axis, of the relative speed of the carrier with respect to the surrounding air. Laser anemometry thus makes it possible to obtain a measurement of speed at a distance, outside of the flow disturbed by the rotor. In order to obtain the three components of the airspeed vector, at least three fixed laser beams are conventionally used, that is to say a beam scanning device making it possible to probe the atmosphere in the three dimensions. A rotating prism makes it possible for example to scan a cone having a small apex angle. However, in certain conditions of use of the helicopter, notably in the case of maneuvering close to obstacles (for example a building or a rock face), the presence of parasitic echoes capable of resulting in an unavailability or even a non-indicated degradation of the accuracy of the speed measurement can be feared in all or some of the sighting axes.

The document FR 2891409 relates to a laser anemometry device with improved eye safety using a scanning cone but not providing any processing capable of dealing with this risk of unavailability or even of loss of integrity of the airspeed measurement.

SUMMARY OF THE INVENTION

A purpose of the invention is to overcome the aforesaid problems and notably to provide a method and a system making it possible, notably during low speed maneuvers, to provide a correct speed of displacement, with respect to the surrounding air, of a rotary wing aircraft, and to do this despite the presence in the measurement environment of elements capable of generating interference echoes.

A purpose of the invention is to allow the pilot of a rotary wing aircraft to have the availability of a correct airspeed, even at low speed, thus preventing him from flying solely by sight, and increasing the safety of the passengers in the aircraft.

A purpose of the invention is also to allow the integral and accurate determination of wind speed when the helicopter is on the ground, with the rotor stopped or rotating. This information is essential during takeoff from an area not equipped with an anemometer, the accurate knowledge of the local wind making it possible to optimize the carrying of payload whilst maintaining the safety of the flight.

According to one aspect of the invention there is proposed a method for determining the speed vector, with respect to the surrounding air, of a rotary wing aircraft equipped with a beam scanning Doppler laser anemometry device for measuring a set of projections of said speed vector in at least four non-coplanar directions, comprising the following steps:

detecting any anomaly of at least one element from the set of measured projections, from a comparison with respect to a first threshold, of a deviation between the measurements and the measurements predicted from a predetermined model depending on values of beam scanning parameters of the anemometry device; and reducing the effect of a detected anomaly by invalidating measurements corresponding to said anomaly and computing the components of the speed vector from valid measurements.

Such a method allows the pilot of a rotary wing aircraft to have the availability of a correct airspeed even at low speed, thus preventing him from having to fly solely by sight, and increasing the safety of the passengers in the aircraft.

In one implementation, the method furthermore comprises a step consisting of estimating a conformity of the valid measurements with said model.

According to one implementation, said estimation uses a standard deviation between the vector constituted by the measurements taken into account and the vector constituted by the corresponding predicted measurements.

For example, the standard can be computed by the sum of the quadratic deviations or the sum of the absolute deviations.

For example, the scanning is continuous, which contributes to providing great measurement redundancy and to limiting the nuisance produced by the presence of obstacles in the measurement environment. Continuous scanning moreover provides better mechanical reliability.

According to one implementation, the step of measuring the projections uses laser beam scanning in a cone having an apex angle greater than a second threshold.

This makes it possible to achieve better accuracy in the estimation of the three components of the airspeed vector.

In one implementation, the second threshold depends on operational parameters of the rotary wing aircraft, said parameters comprising the wing span and/or the limit attitudes of the rotary wing aircraft.

Thus, the maskings of the beam or degradations of the LiDAR signal due to the structures of the helicopter, the blades of the rotor or the ground are limited.

According to one embodiment, the step of measuring the projections uses laser beam scanning according to a cone having a substantially vertical axis when the aircraft is standing on the ground.

This allows a probing of the atmosphere all around the carrier and an accurate estimation of the airspeed despite the presence of obstacles (parasitic echoes) in certain lines of sight (or measuring directions).

According to one implementation, the second threshold is greater than or equal to 60°, and can, in a particularly advantageous manner, be approximately equal to 109.4°.

The value of 109.4° corresponds to a cone tangential to the edges of a cube corner.

The measurement accuracy is then independent of the direction of the speed vector.

In one implementation, said anomaly detection step (Step2) comprises the sub-steps consisting of:
carrying out a spectral analysis in each measuring direction; and
determining, from the spectral analysis, the spectral lines corresponding to the useful signal and to the parasitic signal respectively for each measuring direction.

Thus, it is possible to improve the speed measurement accuracy in the presence, in the measurement environment, of elements likely to generate parasitic LiDAR echoes.

According to another aspect of the invention there is also proposed a Doppler laser anemometry device with 360° scanning according to a cone having an apex angle greater than a threshold, adapted to implement the method as described above.

In one embodiment, the device comprises a dome-shaped window centered on the apex of the scanning cone.

A spherical window thus centered on the apex of the scanning cone makes it possible to seal the system with respect to the exterior whilst ensuring the transmission of the optical beam without introducing optical aberrations other than of symmetry of revolution facilitating the producing of the beam shaping system.

According to one embodiment, the device comprises a first rotating prism comprising a face operating in total internal reflection.

The use of this prism is equivalent, from an optical functioning point of view, to the use of a mirror but making it possible to increase the rigidity of the system, thus limiting the risk of misalignment of the optics. For acute angled scanning cones (apex angle SA<70°), it is possible to produce the deflection of the beam using a prism in transmission mode or another deflection device.

In one embodiment, the device comprises a first opposing prism for balancing the first prism rotating with respect to its axis of rotation.

Thus, the vibrations induced by the rotation of the scanning device are limited.

According to one embodiment the device comprises a second rotating prism disposed upstream of the first rotating prism, with respect to the direction of transmission of the laser optical signal.

According to another aspect of the invention, there is also proposed an aircraft provided with a device such as mentioned above, adapted to be mounted in such a way that the cone has a substantially vertical axis when the aircraft is standing on the ground.

Thus, it is possible to probe the atmosphere all around the helicopter in order to provide maximum redundancy of measurements.

The invention will be better understood on examination of some embodiments described as non-limiting examples and illustrated by the appended drawings in which:

FIG. 1 shows a helicopter equipped with a Doppler laser anemometry device with 360° scanning, according to one aspect of the invention;

FIGS. 2 and 3 are diagrammatic illustrations of two Doppler laser anemometry devices with conical scanning, according to aspects of the invention; and FIGS. 4 through 6 diagrammatically illustrate a method for determining the speed vector, with respect to the surrounding air, of a rotary wing aircraft equipped with a scanning Doppler laser anemometry device for measuring the speed vector of the aircraft with respect to the surrounding air, according to an aspect of the invention.

Items having the same references in all of the figures are similar.

The present invention relates to a method for determining the speed vector $\vec{Vd}$, with respect to the surrounding air, of a rotary wing aircraft, in this case, as shown in FIG. 1, in front and side profile views, a helicopter HL, equipped with a scanning Doppler laser anemometry device, for measuring a set of projections Vm of the speed vector $\vec{Vd}$ in at least four non-coplanar directions.

In the continuation of the description the helicopter HL is mentioned as an example of a rotary wing aircraft but the invention applies to any other type of rotary wing aircraft.

FIG. 1 shows a front view and a side profile view of the helicopter HL.

The scanning according to a cone whose axis is close to the vertical makes it possible to have a scanning of 360° in azimuth and to reduce considerably the risk of discontinuity of measurement due to masking, or, in other words, the appearance of an obstacle in the measurement environment (for example placing the helicopter HL close to a building).

The use of a scanner covering 360° makes it possible to guarantee the continuity of service in all approach conditions.

The rapid rotation (of the order of 300 rpm) necessary for achieving the bandwidth specification of the speed measurement (about 5 Hz) additionally provides spatial selectivity due to the displacement of the optical axis during the forward-and-return time for a distant echo (about 200 m).

The spatial selectivity requirement making it possible to be unaffected by a powerful close echo (obstacle or cloud in the measuring zone) is relaxed. It is in fact preferred to exclude a disturbed angular sector rather than to search an intermediate zone in which the information is perhaps no longer representative of the air flow in which the machine is moving (thermal flow close to a wall).

FIG. 2 is a diagrammatic representation of a conical scanning FL Doppler laser anemometry device according to a cone CO of apex angle AS greater than a threshold, in this case greater than 60° and, in a particularly advantageous manner, substantially equal to 109.4°.

The Doppler laser anemometry device comprises a dome-shaped window HB centered on the apex of the scanning cone CO, and a first rotating prism PR1 with a total internal reflection mirror face, driven in rotation by a first motor MOT1.

The Doppler laser anemometry device also comprises an opposing prism CPR1 balancing the first rotating prism PR1 with respect to its axis of rotation AX.

Figure 1:
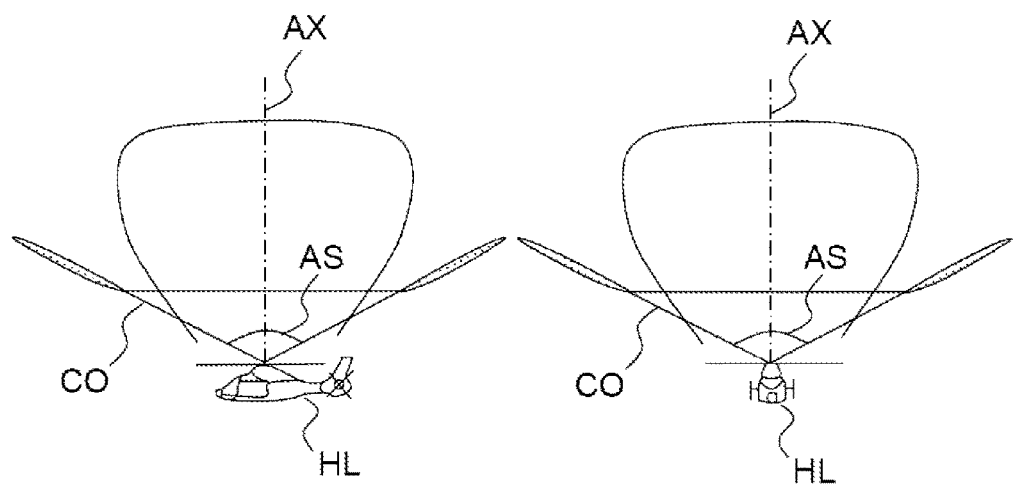
Figure 2:
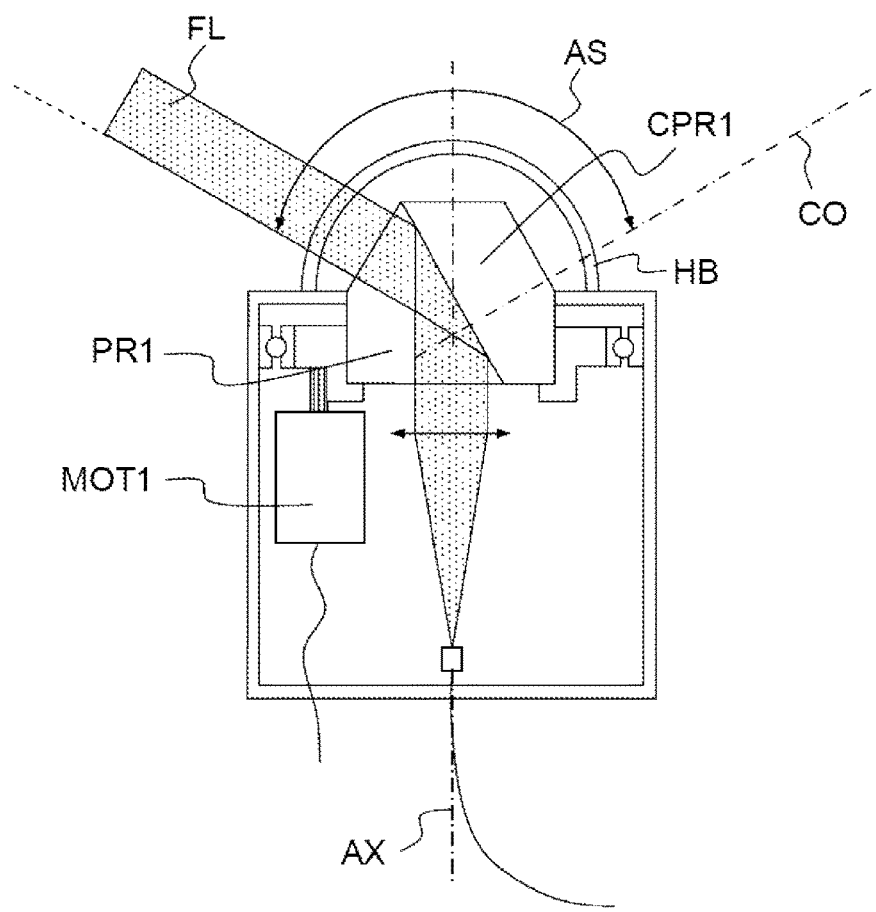
FIGS. 2 and 3 show two examples of conical scanning Doppler laser anemometry devices for measuring a speed vector of the aircraft with respect to the surrounding air.
Figure 3:
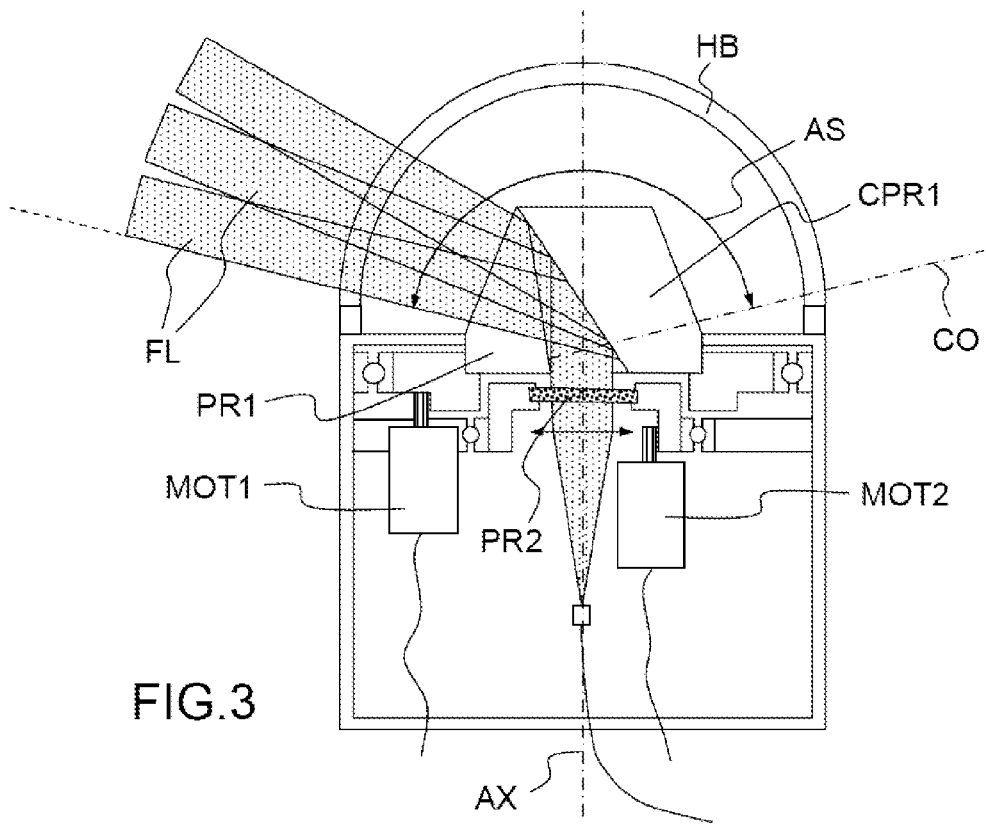

The device variant shown in FIG. 3 furthermore comprises a second rotating prism PR2 disposed upstream of the first rotating prism PR1, with respect to the direction of transmission of the laser optical signal. The second prism PR2 is driven in rotation by a second motor MOT2.

Figure 4:
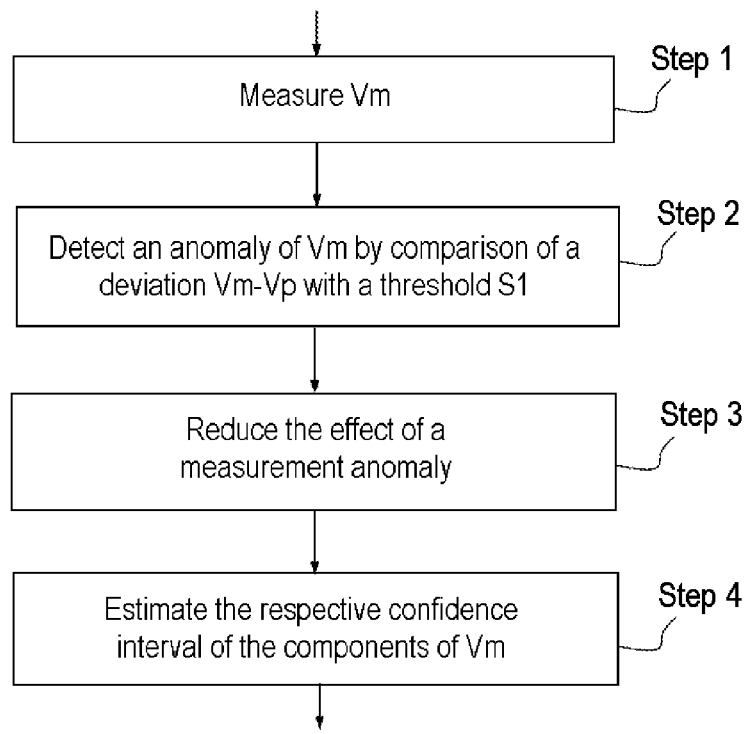

FIG. 4 shows a method for determining the speed vector $\vec{Vd}$, with respect to the surrounding air, of a rotary wing aircraft HL equipped with a scanning Doppler laser anemometry device for measuring, in a step Step1 a set of projections vm of said speed vector $\vec{Vd}$ in at least four non-coplanar directions according to one aspect of the invention.

The method comprises the steps consisting of:
detecting, during a step Step2, any anomaly of at least one element of the set of measured projections Vm, from a comparison with respect to a first threshold S1, of a deviation between the measurements Vm and measurements Vp predicted from a predetermined model depending on values of beam scanning parameters of the anemometry device; and
reducing, during a step Step3, the effect of a detected measuring anomaly by invalidating measurements corresponding to said anomaly and computing the components of the speed vector from valid measurements.

The first threshold, can for example be equal to two to three times the mean quadratic deviation between the measurements and the predicted measurements.

The method can also comprise a step Step4 consisting of estimating the conformity of the valid measurements I'm with said model.

The estimation can use a standard deviation between the vector constituted by the measurements Vm taken into account and the vector constituted by the corresponding predicted Vp. For example, the standard can be calculated by the sum of the quadratic deviations or the sum of the absolute deviations.

The scanning can be continuous, which contributes to providing great redundancy of measurement and to limiting the nuisance caused by the presence of obstacles in the measuring environment. A continuous scanning device moreover has better mechanical reliability.

The step Step1 of measuring the measurements Vm uses measurement according to a cone CO of apex angle AS greater than a second threshold S2 and of axis AX substantially vertical when the aircraft HL is standing on the ground.

The second threshold S2 can depend on operating parameters of the rotary wing aircraft HL, said parameters comprising the wingspan and/or the limit attitudes of the rotary wing aircraft HL. The second threshold can be greater than or equal to 60° and can, in a particularly advantageous manner, be substantially equal to 109.4°.

Figure 5:
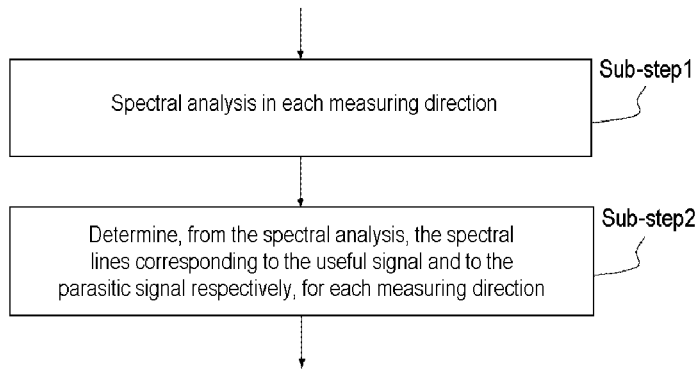

As illustrated in FIG. 5, the anomaly detection step Step2 can comprise the sub-steps consisting of:
carrying out a spectral analysis in each measuring direction (sub-step1); and
determining, from the spectral analysis, the spectral lines corresponding to the useful signal and to the parasitic signal respectively for each measuring direction (sub-step2).

The determination, or distinction, from among the spectral lines detected in the measuring directions, of those corresponding to the useful signal, that is to say coming from the back-scattering of the laser beam FL on the atmospheric particles, and of those corresponding to parasitic signals coming for example from the reflection of the laser beam FL on buildings, rock faces, the ground or even parasitic signals from the analog electronic acquisition system.

This distinction between useful signals and parasitic signals is based, firstly, on the comparison of the magnitudes associated with the spectral lines (spectral width, amplitude and central frequency) with reference values. For example, lines whose amplitude exceeds the amplitude of the expected useful signals 10 dB, taking account of the characteristics of the LiDAR, are considered as parasitic lines and are therefore excluded from the list of candidate lines. Similarly, the lines whose spectral width is abnormally narrow, in consideration of expected speed dispersion within the measuring volume, are considered as being parasitic signals and are therefore excluded from the list of candidate lines.

The reference values associated with the spectral width and with the amplitude of the lines can be constant or they can be re-evaluated continuously, taking account of the preceding measurements. For example, the reference value of the amplitude of a line can be produced by computing an average or median value over a sliding observation window.

Figure 6:
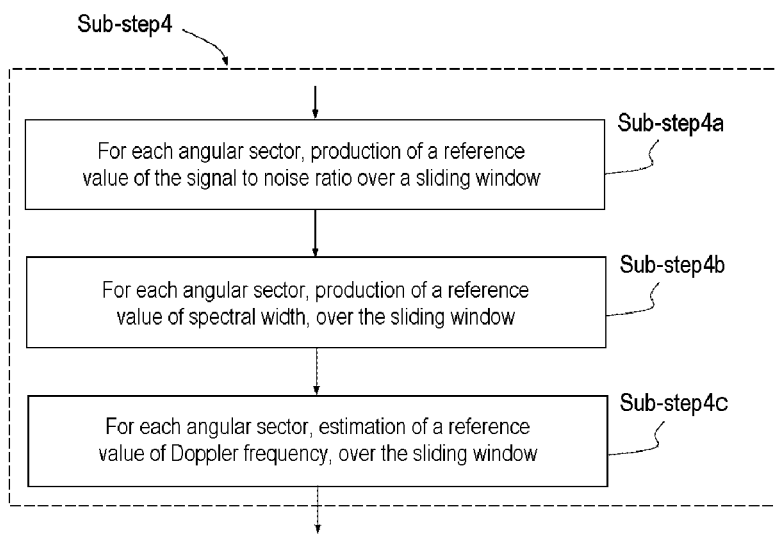

FIG. 6 illustrates additional sub-steps of Step 4 in FIG. 4 where the production of a reference value of the signal to noise ratio over a sliding window is produced for each angular sector (sub-step4a); and,
the production of a reference value of the spectral width, over the sliding window, for each angular sector (sub-step4b); and
for each angular sector, estimating a reference value of Doppler frequency over the sliding window (sub-step4c).

The reference values associated with the central frequencies are based, for each measuring direction, on the a priori estimation of the speed vector at the current time, projected along the measuring axis in question, it being possible for this a priori estimation to be obtained using a Kalman filter.

At the end of this processing step, the estimation of the speed vector is carried out taking account of the Doppler frequency variation model during a scanning cycle of the beam FL.

In the case of conical scanning, the frequency variation model of the signal gathered during a revolution is sinusoidal and defined by three parameters which are the amplitude, the mean value and the phase of the sinusoid.

An algorithm of the least squares type makes it possible to determine the value of the three parameters in such a way that the sinusoid is closest to the observations as defined by the minimizing of the sum of the quadratic deviations between the measurements and the model. Then there is associated with the estimation of the three components of the speed vector resulting from these three parameters an indicator of conformity of the measurements with the model which can be defined as the mean quadratic deviation between the measurements and the model.

The proposed procedure consists in carrying out a first estimation V1 of the speed vector taking account only of the measuring directions for which a single spectral line is a candidate, i.e. has characteristics conforming with the reference values. The mean quadratic deviation EQM1 associated with this is evaluated.

Then, for all of the measuring directions taken into account for the estimation V1, the quadratic deviation between the speed measured in this direction and the projection of V1 in this direction is evaluated. A second estimation of the speed vector V2 is then carried out excluding all of the direction for which this deviation significantly exceeds the mean quadratic deviation EQM1, for example 3×EQM1.

This evaluation can be reiterated, that is to say it is possible to carry out a new check of the quadratic deviation between the speed measured in this direction and the projection of the estimation of the second speed vector V2 which can result in re-evaluating the speed vector excluding additional measuring directions.

If there are measuring directions in which several spectral lines remain candidates after the step of comparisons of the characteristics of the lines with the reference values, the quadratic deviation between these speed values and the projection of the second V2 (obtained in the preceding step) in these measuring axes is evaluated. The measuring directions for which one of the lines results in a small quadratic deviation, for example less than 2×EQM2, are then re-integrated in the computation of the speed vector. A third estimation of the speed vector V3 is then obtained which is based solely on the spectral lines whose characteristics are compatible with the useful signal.

Finally, all possible values of the speed vector are evaluated excluding one of the measuring directions among those taken into account in the third estimation V3. Then there is determined the confidence interval associated with the components of the third speed vector V3 by calculating the maximum deviation between the respective components of the third speed vector V3 and the components of these solutions, these deviations being increased by measuring noise.

The invention claimed is:

1. A method for determining a speed vector, with respect to the surrounding air, of a rotary wing aircraft equipped with a beam scanning Doppler laser anemometry device, configured for continuous scanning, for measuring a set of projections of the speed vector in at least four non-coplanar directions, comprising the laser anemometry device performing the steps of:
   detecting any anomaly of at least one element from the set of measured projections of the speed vector, from a comparison with respect to a first threshold, of a deviation between the measurements of the set of projections and predicted measurements predicted from a predetermined model depending on values of beam scanning parameters of the anemometry device;
   reducing the effect of a detected anomaly by invalidating measurements corresponding to the anomaly;
   computing the components of the speed vector from measurements that have not been invalidated; and
   providing the pilot of the rotary wing aircraft with a correct airspeed based on the measurements that have not been invalidated,
   wherein measuring the set of projections of the speed vector uses the beam scanning Doppler laser beam anemometry device to perform scanning in a conical-shaped volume having an apex angle greater than a second threshold.

2. The method as claimed in claim 1, further comprising estimating a conformity of the valid measurements with the model.

3. The method as claimed in claim 2, wherein estimating the conformity uses a standard deviation between the vector constituted by the measurements of the set of projections taken into account and a vector constituted by the corresponding predicted measurements.

4. The method as claimed in claim 3, characterized in that the standard deviation is computed by a sum of quadratic deviations or a sum of absolute deviations.

5. The method as claimed in claim 1, characterized in that the second threshold depends on operational parameters of the rotary wing aircraft, the operational parameters comprising the wingspan and/or the limit attitudes of the rotary wing aircraft.

6. The method as claimed in claim 1, wherein measuring the set of projections of the speed vector uses the beam scanning Doppler laser anemometry device to perform beam scanning according to a conical-shaped volume having a vertical axis extending from the apex of the cone when the aircraft is standing on the ground.

7. The method as claimed in claim 1, characterized in that the second threshold is greater than or equal to 60°.

8. The method as claimed in claim 1, characterized in that the second threshold is approximately equal to 109.4°.

9. The method as claimed in claim 1, wherein detecting any anomaly comprises:
   performing a spectral analysis in each measuring direction; and
   determining, from the spectral analysis, spectral lines corresponding to a useful signal and corresponding to a parasitic signal respectively for each measuring direction.

10. An aircraft comprising:
    an aircraft body;
    rotary wings; and
    a device for determining a speed vector, with respect to the surrounding air, of the rotary wing aircraft, the device comprising:
       a Doppler laser anemometry device with continuous beam scanning configured to measure a set of projections of a speed vector in at least four non-coplanar directions;
       the anemometry device being further configured to detect any anomaly of at least one element from the set of measured projections of the speed vector, from a comparison with respect to a first threshold, of a deviation between the measurements of the set of projections of the speed vector and predicted measurements predicted from a predetermined model depending on values of beam scanning parameters of the anemometry device, and
       being configured to reduce the effect of a detected anomaly by invalidating measurements corresponding to the detected anomaly and computing the components of the speed vector from measurements that have not been invalidated wherein the laser scanning is continuous scanning according to a conical-shaped volume wherein the conical-shaped volume has an apex angle greater than a second threshold and wherein the device is adapted to be mounted in such a way that the conical-shaped volume has a vertical axis extending from the apex of the conical-shaped volume when the aircraft is standing on the ground.

* * * * *